(12) United States Patent
Masuda

(10) Patent No.: US 10,894,478 B2
(45) Date of Patent: Jan. 19, 2021

(54) VEHICLE AND POWER TRANSMISSION SYSTEM

(71) Applicant: Toyota Jidosha Kabushiki Kaisha, Toyota (JP)

(72) Inventor: Tomokazu Masuda, Kasugai (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 331 days.

(21) Appl. No.: 15/900,869

(22) Filed: Feb. 21, 2018

(65) Prior Publication Data

US 2018/0236889 A1     Aug. 23, 2018

(30) Foreign Application Priority Data

Feb. 23, 2017   (JP) ................................. 2017-031871

(51) Int. Cl.
| | |
|---|---|
| *B60L 11/18* | (2006.01) |
| *B60L 53/14* | (2019.01) |
| *B60L 3/00* | (2019.01) |
| *B60L 53/126* | (2019.01) |
| *B60L 53/62* | (2019.01) |

(52) U.S. Cl.
CPC ................ *B60L 53/14* (2019.02); *B60L 3/00* (2013.01); *B60L 11/1838* (2013.01); *B60L 53/126* (2019.02); *B60L 53/62* (2019.02); *B60L 2240/80* (2013.01); *Y02T 10/70* (2013.01)

(58) Field of Classification Search
None
See application file for complete search history.

(56) References Cited

U.S. PATENT DOCUMENTS

| | | | | |
|---|---|---|---|---|
| 2010/0174667 | A1* | 7/2010 | Vitale ................... | B60L 3/0069 |
| | | | | 705/412 |
| 2011/0016063 | A1* | 1/2011 | Pollack ................ | H02J 7/0071 |
| | | | | 705/412 |
| 2011/0175569 | A1* | 7/2011 | Austin .................. | H01M 10/44 |
| | | | | 320/109 |

(Continued)

FOREIGN PATENT DOCUMENTS

| | | |
|---|---|---|
| CN | 105322594 A | 2/2016 |
| CN | 105811034 A | 7/2016 |

(Continued)

*Primary Examiner* — David V Henze-Gongola
(74) *Attorney, Agent, or Firm* — Dinsmore & Shohl LLP

(57) ABSTRACT

A vehicle includes: a power receiving device configured to receive electric power from a power transmitting unit of a power transmitting device disposed outside the vehicle; a power storage device that stores the electric power received by the power receiving device; an operation device that receives a user's operation, the user's operation including a starting operation performed by a user to start a vehicle system, and a stopping operation performed fey the user to stop the vehicle system; and an electronic control unit configured to i) perform control of executing timer charging of the power storage device based on a time schedule, and ii) perform a process of performing, charging of the power storage device regardless of the timer charging having been set when the timer charging is set and the operation device has received the user's operation before a charging start time based on the time schedule arrives.

8 Claims, 7 Drawing Sheets

(56) References Cited

U.S. PATENT DOCUMENTS

| | | |
|---|---|---|
| 2013/0127409 A1 | 5/2013 | Ichikawa |
| 2013/0193749 A1 | 8/2013 | Nakamura et al. |
| 2015/0008877 A1 | 1/2015 | Ichikawa et al. |
| 2015/0256013 A1* | 9/2015 | Wen .................. H02J 7/342 |
| | | 320/107 |
| 2016/0028262 A1 | 1/2016 | Lee |

FOREIGN PATENT DOCUMENTS

| | | |
|---|---|---|
| JP | 2010-142026 A | 6/2010 |
| JP | 2013-110822 A | 6/2013 |
| JP | 2013-126327 A | 6/2013 |
| JP | 2013-146148 A | 7/2013 |
| JP | 2013-146154 A | 7/2013 |
| JP | 2013154815 A | 8/2013 |
| JP | 2013-172499 A | 9/2013 |
| JP | 2016-059248 A | 4/2016 |

* cited by examiner

VEHICLE AND POWER TRANSMISSION SYSTEM

CROSS-REFERENCE TO RELATED APPLICATIONS

This application claims priority to Japanese Patent Application No. 2017-031871 filed on Feb. 23, 2017, incorporated herein by reference in its entirety.

BACKGROUND

1. Technical Field

The present disclosure relates to a vehicle and a power transmission system, and more particularly, to a vehicle in which a power receiving device that receives electric power from a power transmitting device outside the vehicle is mounted and a power transmission system that transmits electric power from a power transmitting device to a power receiving device of a vehicle.

2. Description of Related Art

A power transmission system that transmits electric power from a power transmitting device outside a vehicle to a power receiving device mounted in the vehicle in a wireless manner is known (For example, see Japanese Unexamined Patent Application Publication No. 2013-154815 (JP 2013-154815 A), Japanese Unexamined Patent Application Publication No. 2013-146154 (JP 2013-146154 A), Japanese Unexamined Patent Application Publication No. 2013-146148 (JP 2013-346148 A), Japanese Unexamined Patent Application Publication No. 2013-110822 (JP 2013-110822), and Japanese Unexamined Patent Application Publication No. 2013-126327 (JP 2013-126327 A)). For example, JP 2013-154815 A discloses a wireless charging system in which a power receiving unit is provided on a bottom surface of a vehicle body and electric power is transmitted from a power transmitting unit installed on the ground to the power receiving unit in a wireless manner to charge an on-board battery (see JP 2013-154815 A).

Japanese Unexamined Patent Application Publication No. 2016-59248 (JP 2016-59248 A) discloses a wired charging system in which a plug of a charging cable is connected to an inlet of a vehicle and a power storage device is charged via the charging cable using a power source outside the vehicle and in which so-called timer charging of starting charging when a predetermined time elapses after the plug is connected to the inlet can be executed.

In timer charging, a vehicle is in a chafing waiting state until a charging start time based on a time schedule of the timer charging arrives. For example, when a malfunction occurs in an input device which is used for a user to set, release and change the timer charging during waiting for charging in the timer charging, the timer charging cannot be released and a situation occurs in which charging cannot be started until the charging start time based on the time schedule of the timer charging arrives even if the user wants to immediately start charging.

Therefore, JP 2016-59248 A discloses that the timer charging is released when an operation of pulling out the plug is repeated a predetermined number of times within a predetermined period of time in a state in which the plug is connected to the inlet and the timer charging is set (see JP 2016-59248 A).

SUMMARY

In a wireless charging system, similarly to a wired charging system, execution of timer charging has been studied. However, in a wireless charging system, a plug (a connector) of a charging cable does not need to be connected to an inlet of a vehicle. Accordingly, in the above-mentioned situation in which charging cannot be started until the charging start time arrives because the timer charging cannot be released by an input device, the wireless charging system cannot employ the above-mentioned technique of releasing the timer charging by the plug being pulled out within a predetermined period of time.

Therefore, the present disclosure provides a vehicle that can receive electric power from a power transmitting device outside a vehicle in a wireless manner and charge a power storage device and a power transmission system, in which charging of the power storage device with the power transmitting device can be started according to a user's desire even if a malfunction occurs in an input device which is used to release timer charging.

An example aspect of disclosure is a vehicle. The vehicle includes a power receiving device configured to receive electric power from a power transmitting unit of a power transmitting device disposed outside the vehicle; a power storage device that stores the electric power received by the power receiving device; an operation device that receives a user's operation, the user's operation including a starting operation performed by a user to start a vehicle system, and a stopping operation performed by the user to stop the vehicle system; and an electronic control unit configured to i) perform control of executing timer charging of the power storage device based on a time schedule, and ii) perform a process of performing charging of the power storage device regardless of the timer charging having been set when the timer charging is set and the operation device has received the user's operation before a charging start time based on the time schedule arrives.

An example aspect of disclosure is a power transmission system for a vehicle. The power transmission system for the vehicle includes a power receiving device configured to receive electric power from a power transmitting unit of a power transmitting device disposed outside the vehicle; a power storage device that stores the electric power received by the power receiving device; an operation device that receives a user's operation, the user's operation including a starting operation performed by a user to start a vehicle system, and a stopping operation performed by the user to stop the vehicle system; and an electronic control unit configured to i) perform control of executing timer charging of performing charging of the power storage device based on a time schedule; and ii) perform a process of performing charging of the power storage device regardless of the timer charging having been set when the timer charging is set and the operation device has received the user's operation before a charging start time based on the time schedule arrives.

The power storage device may be configured to receive the electric power from the power transmitting unit in wireless manner.

In the vehicle and the power transmission system, for example, even if a malfunction occurs in an input device that is used to release the timer charging during waiting for charging in the timer charging, charging of the power storage device with the power transmitting device is performed regardless of the timer charging having been set (even when the timer charging has been set) when the operation device has received the user's operation, in a state in which alignment of the power receiving device with the power transmitting device is completed. Accordingly, with the vehicle and the power transmission system, it is possible to start charging of the power storage device with the power transmitting device according to a user's desire even if a malfunction occurs in the input device or the like that is used to release the timer charging.

In the vehicle and the power transmission system, the timer charging is not released but is maintained even the operation device has received the users operation, in a situation in which alignment of the power receiving device with the power transmitting device is not completed and charging of the power storage device with the power transmitting device cannot be performed (for example, a situation in which the vehicle is parked in a parking lot not having a power transmitting device). Accordingly, with the vehicle and the power transmission system, it is possible to prevent unnecessary releasing of the timer charging in a situation in which charging of the power storage device with the power transmitting device cannot be performed.

The time schedule includes at least one of a charging start time and a charging end time. When the charging end time is set, the charging start time is determined in consideration of a time required for charging of the power storage device, an electrical charge for charging, a waiting time until departure in a fully charged state, and the like and charging of the power storage device is started when the charging start time arrives.

The state in which alignment of the power receiving device with the power transmitting device is completed refers to, for example, a state in which an amount of misalignment of the power receiving device with the power transmitting device is within a predetermined range or a state in which power transmission efficiency between the power transmitting device and the power receiving device is equal to or higher than a predetermined level.

The electronic control unit may be configured to perform the process regardless of the timer charging having been set when the timer charging is set and the operation device has received the user's operation before the charging start time arrives, in a state in which a pairing process of associating the vehicle with the power transmitting device is completed.

Accordingly, the time at which a predetermined operation for performing charging of the power storage device with the power transmitting device is received regardless of the timer charging having been set can be restricted to after the pairing process which is performed before the charging of the power storage device with the power transmitting device is completed and it is thus possible to prevent unnecessary releasing of the timer charging.

The electronic control unit may be configured to determine that the operation device has received the users operation when the operation device has been operated a plurality of times within a predetermined time.

According to this configuration, it is possible to prevent the timer charging from being released by an erroneous operation of the operation device.

The electronic control unit may be configured to stop performing the process and to perform the timer charging when the operation device has additionally received the user's operation after the operation device has once received the user's operation.

According to this configuration, even when the timer charging is released by an erroneous operation of the operation device, it is possible to perform the timer charging again.

The vehicle may further include an inlet configured to connect to a connector of a charging cable that is connected to a power source outside the vehicle. The vehicle may be configured to charge the power storage device with the power source via the charging cable and the inlet. The electronic control unit may be configured to i) perform control of performing the timer charging when the connector is connected to the inlet, and ii) perform control of performing a process of charging the power storage device with the power source regardless of the tinier charging having been set when the timer charging is set and a predetermined operation is performed on the connector before the charging start time arrives, in a state in which the connector is connected to the inlet.

According to this configuration, when wired charging of charging the power storage device with the external power source via the charging cable and the inlet is performed, the timer charging can be released by a technique (the connector operation) suitable for wired charging.

According to the present disclosure, in a vehicle and a power transmission system in which electric power can be received from the power transmitting device outside the vehicle in a wireless manner and the power storage device can be charged with the received electric power, it is possible to start charging of the power storage device with the power transmitting device according to a user's desire even if a malfunction occurs in an input device or the like which is used to release the timer charging.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
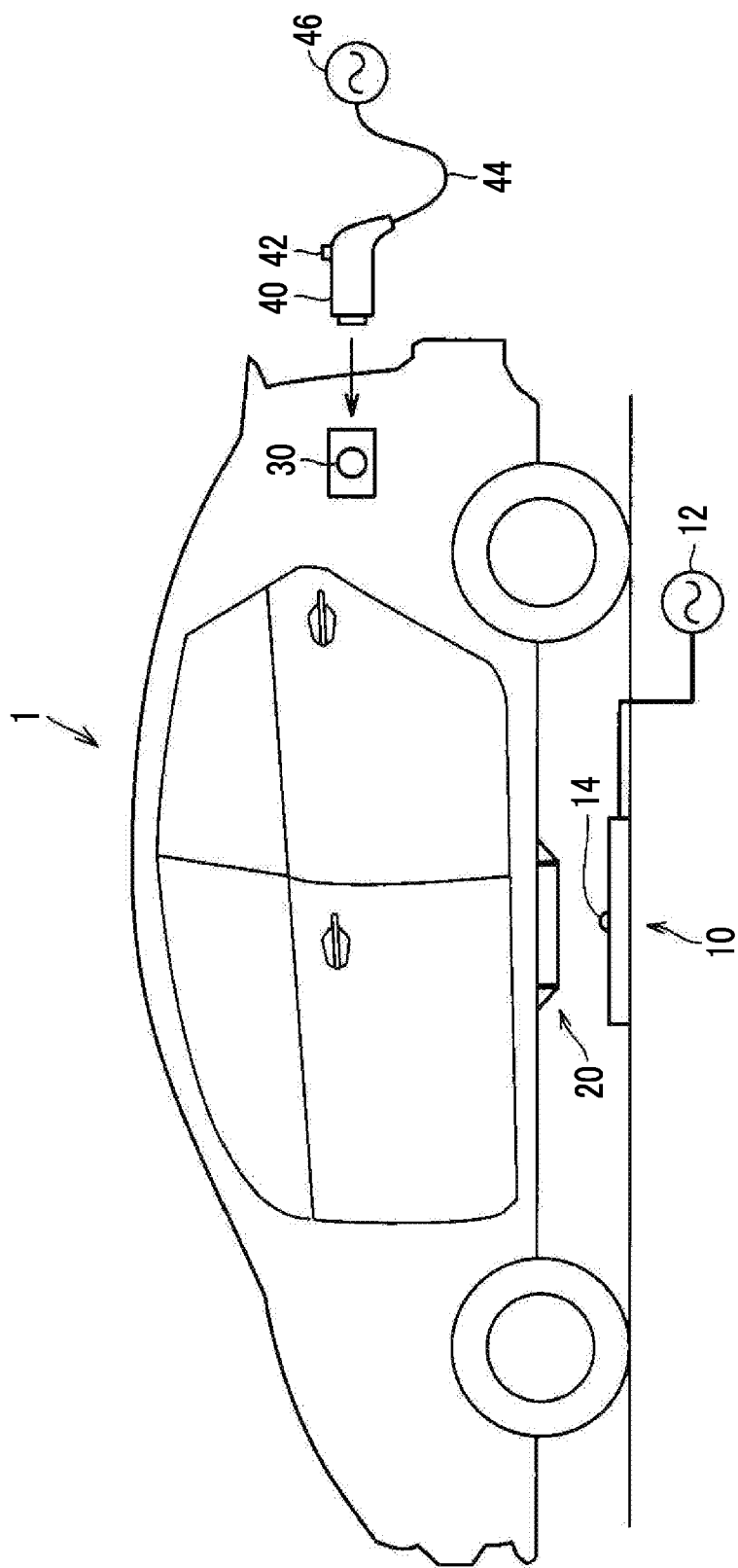
FIG. 1 is a diagram illustrating a whole power transmission system according to a first embodiment of the present disclosure.

Hereinafter, an embodiment of the present disclosure will be described in detail with reference to the accompanying drawings. In the drawings, the same or corresponding elements will be referenced by the same reference signs and description thereof will not be repeated.

[First embodiment] FIG. 1 is a diagram illustrating a whole power transmission system according to a first embodiment of the present disclosure. Referring to FIG. 1, the power transmission system includes a vehicle 1 and a power transmitting device 10. The vehicle 1 includes a power receiving device 20. The power receiving device 20 is disposed on the bottom surface (a road surface side) of the vehicle 1.

The power transmitting device 10 is supplied with electric power from an AG power source 12 (for example, a commercial system power supply). The power transmitting device 10 is provided on the ground surface and is configured to transmit electric power to the power receiving device 20 via a magnetic field in a wireless manner in a state in which the vehicle 1 is aligned such that the power receiving device 20 of the vehicle 1 faces the power transmitting device 10.

The power transmitting device 10 includes a camera 14. The camera 14 includes a fish-eye lens and is disposed substantially at the center of the top surface of the power transmitting device 10. Since the camera 14 includes the fish-eye lens, the camera 14 is configured to image a wide space including the power receiving device 20 when the vehicle 1 moves to the power transmitting device 10. It is possible to detect a positional relationship of the power receiving device 20 relative to the power transmitting device 10 using an image captured by the camera 14 and to align the power receiving device 29 with the power transmitting device 10.

Specifically, when the vehicle 1 moves to the power transmitting device 10, the surroundings of the camera 14 are imaged by the camera 14 and image data is transmitted to the vehicle 1. Marks for detecting the position of the power receiving device 20 using the camera 14 are provided on the bottom surface of the power receiving device 20 (the surface facing the power transmitting device 10).

Figure 2:
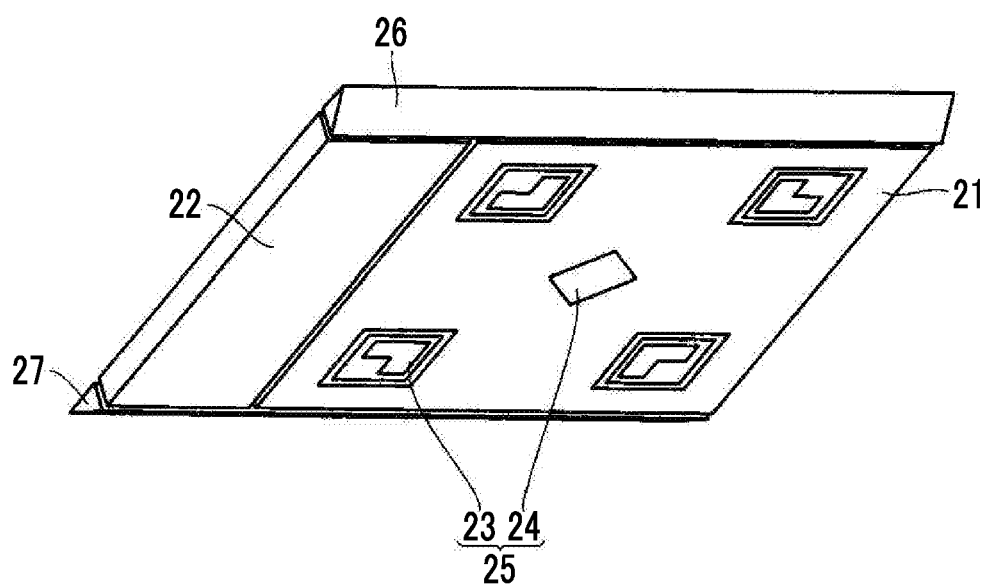
FIG. 2 is a diagram illustrating an example of marks which are provided, in a power receiving device.

FIG. 2 is a diagram illustrating an example of marks which are provided in the power receiving device 20. Referring to FIG. 2, the power receiving device 20 includes a resin case 21, a metal case 22, and protective members 26 and 27. The resin case 21 accommodates a power receiving coil (not illustrated) that receives electric power from the power transmitting device 10 in a wireless manner. The metal case 22 accommodates electrical units (not illustrated) such as a filter circuit and a rectifier unit. The protective members 26 and 27 are disposed on the front side and the rear side in the vehicle front-rear direction of the resin case 21 and the metal case 22 and serve to protect the power receiving device 20 from interference with a road surface.

In this example, marks 23 and 24 are provided at four corners and the substantial center of the resin ease 21. When the vehicle 1 (the power receiving device 20) is aligned with the power transmitting device 10, imaging with the camera 14 is performed, the marks are detected from the image data, and the relative positional relationship (a horizontal direction and a gap) between the power transmitting device 10 and the power receiving device 20 is calculated based on the sizes and positions of the detected marks 23 and 24.

Referring back to FIG. 1, the vehicle 1 further includes a charging inlet 30. The charging inlet 30 is configured to be connected to a connector 40 of a charging, cable 44 that is connected to a power source 46 (which may be the AC power source 12) outside the vehicle. That is, the vehicle 1 can receive electric power from the power transmitting device 10 using the power receiving device 20 in a wireless manner to charge an on-board power storage device (not illustrated) and can also receive electric power from the power source 46 outside the vehicle via the charging cable 44 and the charging inlet 30 to charge the power storage device. In the following description, the former is referred to as "wireless charging" and the latter is referred to as "wired charging." The wireless charging and the wired charging are both for charging the power storage device 300 with a power source outside the vehicle. Accordingly, wireless charging and wired charging may be referred to as "external charging."

A mechanical locking mechanism (not illustrated) is provided in the charging inlet 30 and the connector 40 such that the connector 40 is not easily pulled out from the charging inlet 30 at the time of connecting the connector 40 to the charging inlet 30. A switch 42 for releasing the mechanical locked state of the charging inlet 30 and the connector 40 is provided in the connector 40, and a user can detach the connector 40 from the charging inlet 30 by operating the switch 42.

Figure 3:
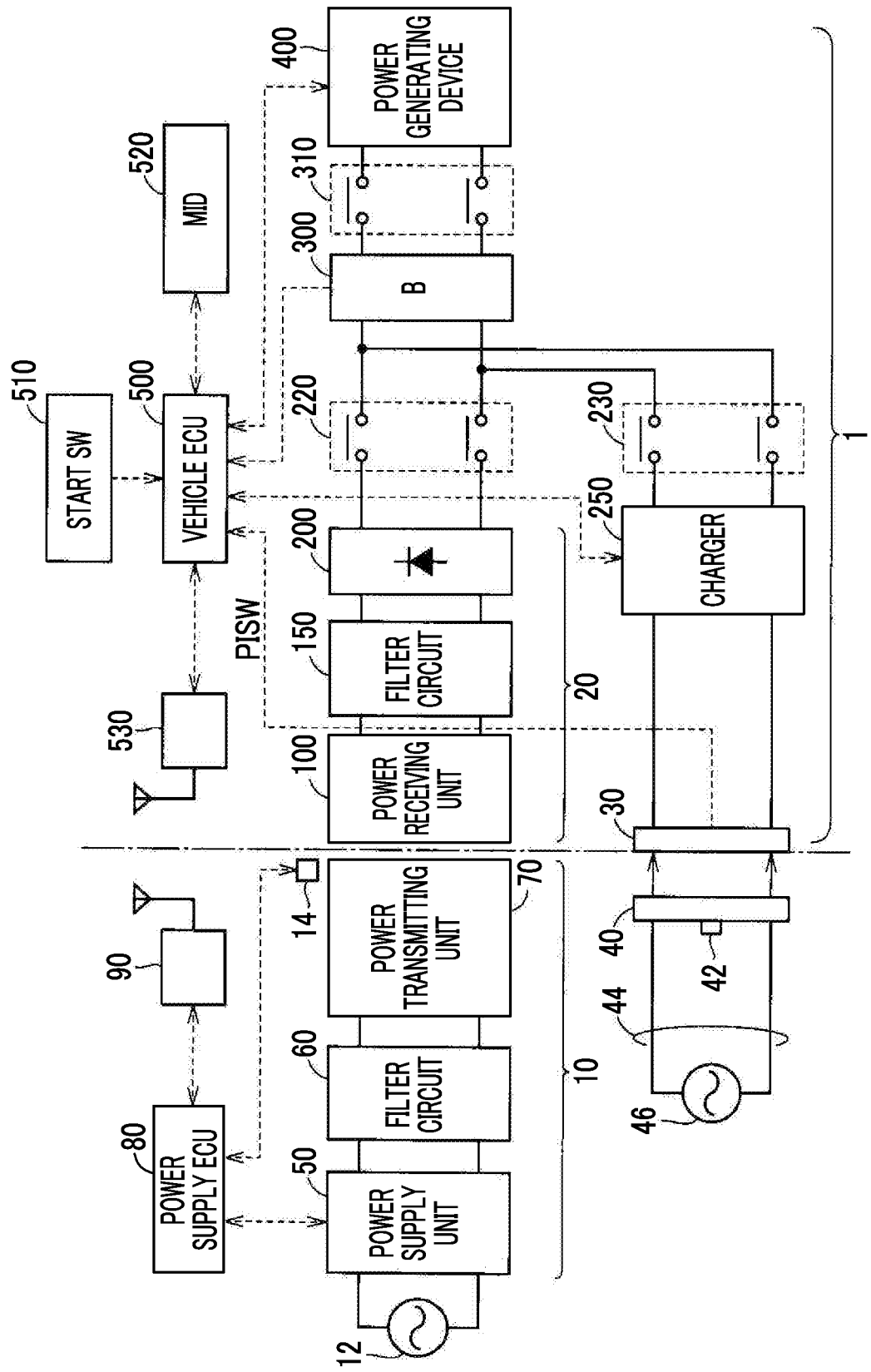
FIG. 3 is a diagram illustrating a configuration of the power transmission system illustrated in FIG. 1.

FIG. 3 is a diagram illustrating a configuration of the power transmission system illustrated in FIG. 1. Referring to FIG. 3, the vehicle 1 includes a power receiving unit 100, a filter circuit 150, a rectifier circuit 200, a power storage device 300, a power generating device 400, and relays 220 and 310. The vehicle 1 further includes a charging inlet 30, a charger 250, and a relay 230. The vehicle 1 further includes a vehicle electronic control unit (ECU) 500, a start switch 510, a multi information display (MID) 520, and a communication device 530.

The power receiving unit 100 receives electric power (AC power) output from a power transmitting unit 70 (which will be described later) of the power transmitting device 10 via a magnetic field in a wireless manner without passing through a contact. The power receiving unit 109 includes, for example, a resonance circuit (not illustrated) that receives electric power from the power transmitting unit 70 in a wireless manner. The resonance circuit can include a coil and a capacitor, but the capacitor may not be provided when a desired resonant state is formed using only the coil.

The filter circuit 150 is disposed between the power receiving unit 100 and the rectifier circuit 200, and reduces harmonic noise which is generated at the time of reception of electric power by the power receiving unit 100. The filter circuit 150 is constituted, for example, by an LC circuit including an inductor and a capacitor. The rectifier circuit 200 rectifies AC power received by the power receiving unit 100 and outputs the rectified AC power to the power storage device 300. The rectifier circuit 200 includes a smoothing capacitor in addition to a rectifier.

The power storage device 300 is a DC power source which is rechargeable and includes a secondary battery such as a lithium-ion battery or a nickel-hydride secondary battery. The power storage device 300 stores electric power output from the rectifier circuit 200 during execution of wireless charging and can also store electric power output from the charger 250 (which will be described later) during execution of wired charging and electric power generated by the power generating device 400 during traveling and the like. The power storage device 300 supplies the stored electric power to the power generating device 400. An electric double-layer capacitor or the like can be employed as the power storage device 300.

The power generating device 400 generates a traveling driving force of the vehicle 1 using the electric power stored in the power storage device 300. Although not particularly illustrated, the power generating device 400 includes, for example, an inverter that receives electric power from the power storage device 300, a motor that is driven by the inverter, and driving wheels that are driven by the motor. The power generating device 400 may include a power generator that generates electric power for charging the power storage device 300 and an engine that can drive the power generator.

A relay 220 is disposed between the rectifier circuit 200 and the power storage device 300. The relay 220 is turned on (a connected state) at the time of wireless charging. An SMR 310 is disposed between the power storage device 330 and the power generating device 400. The SMR 310 is turned on when starting of the power generating device 400 is requested.

The charging inlet 30 is configured to be connected to the connector 40 of the charging cable 44. At the time of execution of wired charging, the charging inlet 30 receives electric power supplied from the power source 46 outside the vehicle via the connector 40 and outputs: the received electric power to the charger 250. The charging inlet 30 outputs a connector connection signal PISW indicating a connection state to the connector 40 to the vehicle ECU 500. The connector connection signal PISW is, for example, a signal of which a potential varies depending on the connection state between the charging inlet 30 and the connector 40, and the potential thereof varies depending on a connected state, a disconnected state, and a state in which a switch 42 of the connector 40 is operated in the connected state.

The charger 250 is controlled by the vehicle ECU 500, converts electric power received by the charging inlet 30 into electric power with a charging voltage of the power storage device 300, and outputs the converted electric power to the power storage device 300. The charger 250 includes, for example, a converter, an inverter, an insulating transformer, and a rectifier circuit. A relay 230 is disposed between the charger 250 and the power storage device 300. The relay 230 is turned on (a connected state) at the time of wired charging.

The start switch 510 is a switch that is used to receive a system starting operation and a system stopping operation (a user's operation) of the vehicle 1 from a user. For example, the vehicle system is started when the start switch 510 is turned on, and the vehicle system is stopped when the start switch 510 is turned off. Whenever the start switch 510 is pushed, the state of the vehicle 1 may be sequentially switched to system stop, accessory mode, system start, and system stop. Instead of the start switch 510, an ignition switch or a power switch having the same function as the start switch 510 may be employed.

The MID 520 is a display device that displays a variety of information in the vehicle 1 and to which a user can input an operation and includes, for example, a liquid crystal display or an organic electroluminescence (EL) display to which a touch can be input. In the vehicle 1 according to the first embodiment, timer charging in which external charging (wireless charging or wired charging) is performed in accordance with a time schedule can be executed, and the MID 520 is configured such that a user can set the timer charging. Specifically, the MID 520 is configured such that a user can input a scheduled departure time of the vehicle 1 and the timer charging is executed in accordance with the time schedule which is calculated based on the input scheduled departure time. The MID 520 is configured such that a user can release the set timer charging.

The communication device 530 is configured to wirelessly communicate with a communication device 90 of the power transmitting device 10. The communication device 530 transmits and receives information such as start/stop of power transmission or a power receiving state (such as a received voltage) of the vehicle 1 to and from the communication device 90 at the time of alignment between the power transmitting unit 70 and the power receiving unit 100 or at the time of execution of wireless charging.

The vehicle ECU 500 includes a central processing unit (CPU), a memory (a read only memory (ROM) and a random access memory (RAM)), and input/output ports for inputting/outputting various signals (all of which are not illustrated), and performs a predetermined arithmetic operation based on information stored in the memory or information from, various sensors. The vehicle ECU 500 controls the devices of the vehicle 1 based on the arithmetic operation result.

For example, when wireless charging is executed, the vehicle ECU 500 performs a process of aligning the power receiving unit 100 with the power transmitting unit 70 of the power transmitting device 10 before executing the wireless charging. "Alignment" refers to alignment in a vehicle body horizontal direction of the power receiving unit 100 with the power transmitting unit 70. For example, the vehicle ECU 500 receives an image captured by the camera 14 of the power transmitting device 10 via the communication devices 90 and 530, and controls the power generating device 400 and a steering wheel which is not illustrated such that the vehicle 1 stops at a position at which the power receiving unit 100 faces the power transmitting unit 70.

The vehicle ECU 500 performs a pairing process of associating the vehicle 1 with the power transmitting device 30 after the alignment process is completed. "Pairing" refers to association of the vehicle 1 with the power transmitting device 10. When, a plurality of parking spaces including a power transmitting device are arranged adjacent to each other, the pairing process is performed to associate a vehicle parked in a certain parking space with a power transmitting device of the corresponding parking space. When the alignment process and the pairing process are completed, the vehicle 1 can execute wireless charging.

In the pairing process, for example, weak electric power (electric power which is lower than transmission power at the time of charging the power storage device 300 of the vehicle 1) including information specific to each power transmitting device is output from the power transmitting unit of the power transmitting device, and the corresponding power transmitting device is recognized by the vehicle 1 based on the above information included in the weak electric power received by the vehicle 1.

Figure 4:
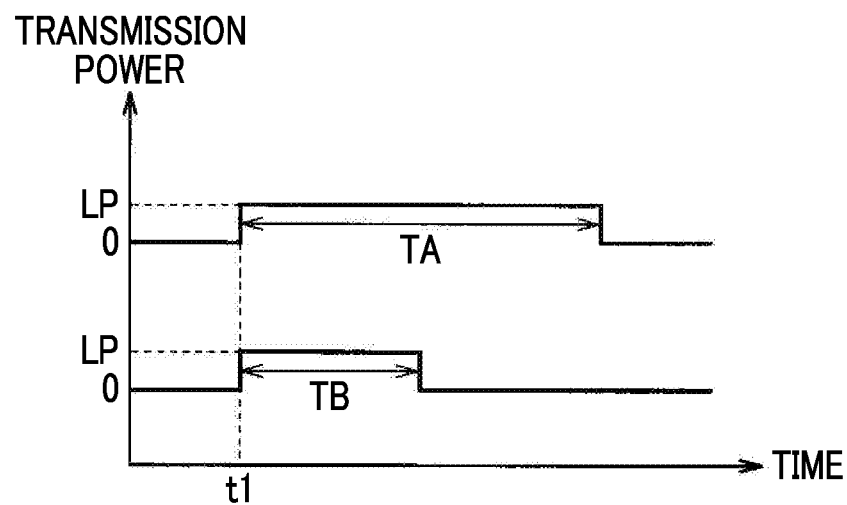
FIG. 4 is a diagram illustrating an example of weak electric power which is output from a power transmitting device in a pairing process.

FIG. 4 is a diagram illustrating an example of weak electric power which is output from each power transmitting device in the pairing process. Here, it is assumed that power transmitting devices 10A and 10B are provided in two neighboring parking spaces, respectively.

Referring to FIG. 4, when the pairing process is started at time t1, the power transmitting device 10A outputs weak electric power LP for a time TA specific to the power transmitting device 10A. On the other hand, the power transmitting device 10B outputs weak electric power LP for a time TB (≠TA) specific to the power transmitting device 10B. The vehicle 1 is associated with the power transmitting device 10A when a time for receiving the weak electric power LP in the vehicle 1 is the time TA, and the vehicle 1 is associated with the power transmitting device 10B when a time for receiving the weak electric power LP is the time TB.

The method of delivering information specific to each power transmitting device using weak electric power is not limited to the above-mentioned method, but, for example, weak electric power of a pulse shape having a pulse width or a period specific to a power transmitting device may be output from each power transmitting device.

Referring back to FIG. 3, when the alignment process and the pairing process are completed, the vehicle ECU 500 turns on the relay 220 and transmits a power transmission start command to the power transmitting device 10 via the communication device 530.

When wired charging is executed and connection of the connector 40 of the charging cable 44 to the charging inlet 30 is detected based on the connector connection signal PISW, the vehicle ECU 500 turns on the relay 230 and drives the charger 250.

In the vehicle 1 according to the first embodiment, the vehicle ECU 500 performs control for the timer charging and control for an operation of releasing the timer charging as principal control which is performed by the vehicle ECU 500. Such control will be described later in detail.

On the other hand, the power transmitting device 10 includes a power supply unit 50, a filter circuit 60, a power transmitting unit 70, a camera 14, a power supply ECU 80, and a communication device 90. The power supply unit 50 receives electric power from, the AC power source 12 and generates AC power of a predetermined transmission frequency. For example, the power supply unit 50 includes a power factor correction (PFC) circuit and an inverter that converts DC power received from the PFC circuit into AC power of a predetermined transmission frequency (for example, several tens of kHz).

The power transmitting unit 70 receives AC power of a transmission frequency from the power supply unit 50 and transmits the received electric power to the power receiving unit 100 of the vehicle 1 via a magnetic field generated around the power transmitting unit 70 in a wireless manner. The power transmitting unit 70 includes, for example, a resonance circuit that transmit electric power to the power receiving unit 100 in a wireless manner. The resonance circuit includes a coil and a capacitor, but when a desired resonant state is formed using only the coil, the capacitor may not be provided.

The filter circuit 60 is disposed between the power supply unit 50 and the power transmitting unit 70 and suppresses harmonic noise which is generated from the power supply unit 50. The filter circuit 60 is constituted by, for example, an LC circuit including an inductor and capacitor.

The power supply ECU 80 includes CPU, a memory (a ROM and a RAM), and input/output ports for inputting/outputting various signals (all of which are not illustrated), and performs a predetermined arithmetic operation based on information stored in the memory or information from various sensors. The power supply ECU 80 controls the devices of the power transmitting device 10 based on the arithmetic operation result. For example, the power supply ECU 80 performs switching control of the power supply unit 50 such that the power supply unit 50 generates AC power of a predetermined transmission frequency.

The communication device 90 is configured to wirelessly communicate with the communication device 530 of the vehicle 1. The communication device 90 transmits and receives information such as start/stop of power transmission or a power receiving state (such as a received voltage) of the vehicle 1 to and from the communication device 530 at the time of performing alignment or at the time of execution of wireless charging.

In the power transmitting device 10 of the power transmission system, AC power of a predetermined transmission frequency is supplied from the power supply unit 50 to the power transmitting unit 70 via the filter circuit 60. Each of the power transmitting unit 70 and the power receiving unit 100 of the vehicle 1 includes a coil and a capacitor and is designed to resonate at the transmission frequency.

When AC power is supplied from the power supply Unit 50 to the power transmitting unit 70 via the filter circuit 60, energy (electric power) is transmitted from the power transmitting unit 70 to the power receiving unit 100 via a magnetic field which is formed between the coil of the power transmitting unit 70 and the coil of the power receiving unit 100. The energy (electric power) transmitted to the power receiving unit 100 is supplied to the power storage device 300 via the filter circuit 150 and the rectifier circuit 200.

Figure 5:
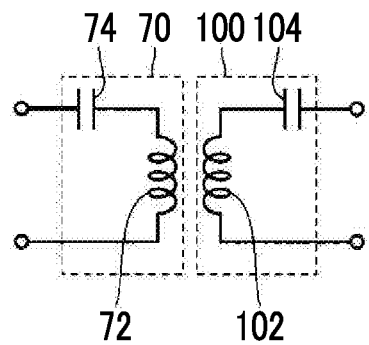
FIG. 5 is a diagram illustrating an example of a circuit configuration of a power transmitting unit and a power receiving unit illustrated in FIG. 3.

FIG. 3 is s diagram illustrating an example of a circuit configuration of the power transmitting unit 70 and the power receiving unit 100 illustrated in FIG. 3. Referring to FIG. 5, the power transmitting unit 70 includes a coil 72 and a capacitor 74. The capacitor 74 is connected in series to the coil 72 to form a resonance circuit along with the coil 12. The capacitor 74 is provided to tune a resonance frequency of the power transmitting unit 70. A Q value indicating resonance strength of the resonance circuit which is formed by the coil 72 and the capacitor 74 is equal to or greater than 100 in some embodiments.

The power receiving unit 100 includes a coil 102 and a capacitor 104. The capacitor 104 is connected in series to the coil 102 to form a resonance circuit along with the coil 102. The capacitor 104 is provided to tune a resonance frequency of the power receiving unit 100. The Q Value of the resonance circuit which is formed by the coil 102 and the capacitor 104 is also equal to or greater than 100 in some embodiments.

In each of the power transmitting unit 70 and the power receiving unit 100, the capacitor may be connected in parallel to the coil. When a desired resonance frequency can be achieved without providing the capacitor, the capacitor may not be provided.

Although not particularly illustrated, the structure of the coils 72 and 102 is not particularly limited. For example, when the power transmitting unit 70 and the power receiving unit 100 oppose each other, a coil having a spiral shape or a helical shape wound on a shaft parallel to a direction in which the power transmitting unit 70 and the power receiving unit 100 are arranged can be employed as each of the power transmitting coil 72 and the power receiving coil 102. Alternatively, when the power transmitting unit 70 and the power receiving unit 100 oppose each other, a coil formed by winding an electric wire on a ferrite slab of which a normal direction is parallel to the direction in which the power transmitting unit 70 and the power receiving unit 100 are arranged may be employed as each of the power transmitting coil 72 and the power receiving coil 102.

Referring back to FIG. 3, in the vehicle 1 according to the first embodiment, the vehicle ECU 500 performs control for the timer charging and control for an operation of releasing the timer charging as described above. Each control will be described below.

In the first embodiment, when wireless charging is possible and timer charging is set while the wireless charging is being performed, the wireless charging based on a time schedule of the tuner charging is executed after the process of aligning the power receiving unit 100 with the power transmitting unit 70 and the pairing process of associating the vehicle 1 with the power transmitting device 10 have been completed. When wired charging is performed and die timer charging is set, the wired charging based on the time schedule of the timer charging is executed after the connector 40 of the charging cable 44 is connected to the charging inlet 30. In the first embodiment, the vehicle ECU 500 calculates the time schedule of the timer charging based on a scheduled departure time which is input and set via the MID 520 by a user.

For example, the vehicle ECU 500 determines a charging end time with a predetermined margin with respect to the scheduled departure time based on the scheduled departure time of the vehicle 1. Subsequently, the vehicle ECU 500 determines a start time of external charging in consideration of a time required for the external charging, an electric charge for the external charging, a waiting time up to departure in a fully charged state, and the like.

The MID 520 may directly set an end time of the external charging and the start time of the external charging may be determined in consideration of all the above-mentioned conditions such as the time required for the external charging. Alternatively, the MID 520 may directly set the start time of the external charging and may start the external charging when the set charging start time arrives.

The vehicle ECU 500 has a timer built therein, and turns on the relay 220 (FIG. 3) (turns off the relays 230 and 310) and instructs the power transmitting device 10 to start transmission of electric power via the communication, device 530 when the wireless charging is performed and the charging start time arrives. When charging of the power storage device 300 is completed, the vehicle ECU 500 instructs the power transmitting device 10 to stop the transmission of electric power via the communication device 530 and turns off the relay 220. When wired charging is performed and the charging start time arrives, the vehicle ECU 500 turns on the relay 230 (FIG. 3) (turns off the relays 220 and 310) and outputs a drive signal to the charger 250.

In timer charging, the vehicle 1 is in a charging waiting state until the charging start time based on the time schedule of the timer charging arrives. When a user wants to immediately start external charging due to a change in the user's schedule on a next day or the like even in the charging waiting state based on the timer charging, external charging can be started with departure from the charging waiting state by releasing the timer chafing on the MID 520.

When a malfunction that input from the MID 520 is disabled occurs in the charging waiting state based on the tuner charging, the timer charging may not be released using the MID 520. Then, even when a user wants to immediately start the external charging, a situation in which the external charging may not be started until the charging start time based on the time schedule of the timer charging arrives occurs.

When the wired charging is performed, the timer charging can be released by pulling out the connecter 40 of the charging cable 44 from the charging inlet 30 within a predetermined time as described in JP 2016-59248 A. However, when the wireless charging is performed, the connector 40 does not need to be connected to the charging inlet 30. Accordingly, as for the situation in which the timer charging cannot be released using the MID 520, the above-mentioned method of releasing the timer charging by pulling out the connector 40 from the charging inlet 30 cannot be employed.

Therefore, in the vehicle 1 according to the first embodiment, when the timer charging is set and the start switch 510 receives a predetermined operation before the start time of the wireless charging based on the time schedule arrives in a state in which the alignment of the power receiving unit 100 with the power transmitting unit 70 is completed and the pairing process of associating the vehicle 1 with the power transmitting device 10 is completed, the vehicle ECU 500 performs a process of executing wireless charging regardless of the timer charging having been set.

The predetermined operation is, for example, an operation of turning on and off the start switch 510 within a predetermined time. In order to prevent the tinier charging from being, released by an erroneous operation of the start switch 510, the predetermined operation has been performed when the operation of turning on/off the start switch 510 a plurality of times in a predetermined time in some embodiments.

The process for starting wireless charging includes processes of causing the vehicle ECU 500 to turn on the relay 220 (FIG. 1) (turn off the relays 230 and 310) and to instruct the power transmitting device 10 to start the external charging via the communication device 530.

Accordingly, in the vehicle 1 according to the first embodiment, even if a malfunction in which input from the MID 520 is disabled occurs in the charging waiting state based on the timer charging, wireless charging is executed regardless of the timer charging having been set (even when the timer charging has been set) by causing a user to perform a predetermined operation on the start switch 510 in a state in which the alignment process and the pairing process are completed. Accordingly, according to the first embodiment, it is possible to start the wireless charging according to a user's desire even when a malfunction in which the timer charging cannot be released using the MID 520 occurs.

In the vehicle 1 according to the first embodiment, in a situation in which the alignment process and the pairing process are not completed and the wireless charging cannot be performed (for example, a situation in which the vehicle is parked in a parking lot not having a power transmitting device 10), the timer charging is not released but maintained even when a user performs a predetermined operation on the start switch 510. Accordingly, according to the first embodiment, it is possible to prevent, the timer charging from being unnecessarily released in a situation in which the wireless charging cannot be performed.

In the above description, a period in which the start switch 510 receives a predetermined releasing operation is set to a state in which the alignment process and the pairing process are completed in order to prevent the timer charging from being unnecessarily released, the start switch 510 may receive a predetermined, releasing operation when the alignment process is completed except the completion of the pairing process.

Figure 6:
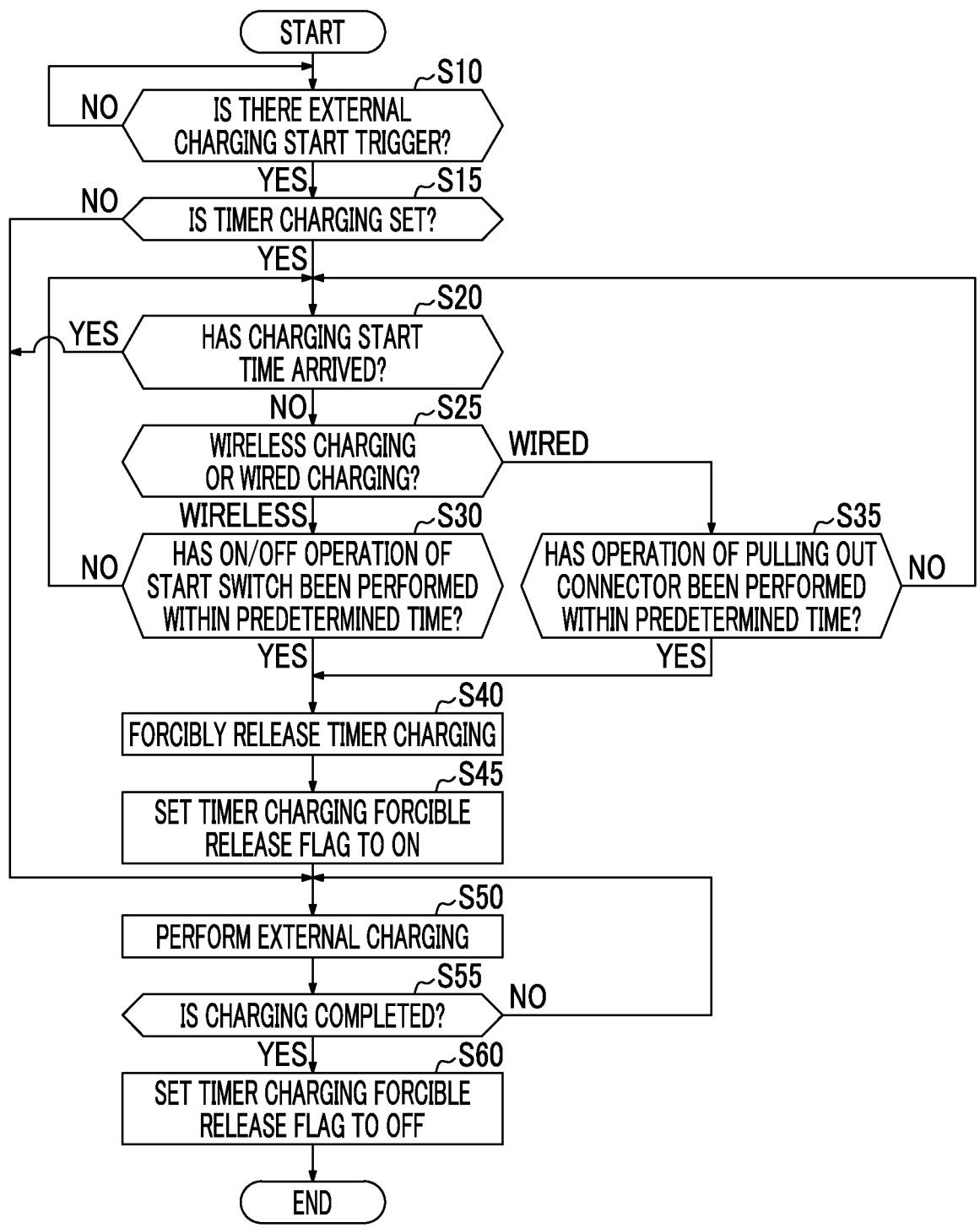
FIG. 6 is a flowchart illustrating a routine of a releasing operation when Inner charging cannot be released by an MID.

FIG. 6 is a flowchart illustrating a routine of a releasing operation when the timer charging cannot be released using the MID 520. A series of processes illustrated in the flowchart is started when there is an external charging start trigger, that is, when alignment of the power receiving unit 100 with the power transmitting unit 70 is completed and when the pairing process of associating the vehicle 1 with the power transmitting device 10 is completed (at the time of wireless charging) or when the connector 40 of the charging cable 44 is connected to the charging inlet 30 (at the time of wired charging).

Referring to FIG. 6, when there is an external charging start trigger (YES in Step S10), the vehicle ECU 500 determines whether timer charging has been set (Step S15). Specifically, it is determined whether a scheduled departure time on a next day is input to the MID 520 and whether a time schedule of the timer charging is set based on the scheduled departure time.

When it is determined in Step S15 that the timer charging has been set (YES in Step S15), the vehicle ECU 500 determines whether an external charging start time based on the time schedule of the timer charging has arrived (Step S20).

When it is determined in Step S20 that the external charging start time based on the time schedule of the timer charging has not arrived (NO in Step S20), the vehicle ECU 500 determines whether the external charging is wireless charging using electric power received by the power receiving device 20 or wired charging using electric power input from the charging inlet 30 (Step S25). This determination can be performed, for example, depending on whether the external charging start trigger is based on completion of the alignment of the power receiving unit 100 with the power transmitting unit 70 and completion of the pairing process of associating the vehicle 1 with the power transmitting device 10 (wireless charging) or is based on connection of the connector 40 of the charging cable 44 to the charging inlet 30 (wired charging).

When it is determined in Step S25 that the external charging is the wireless charging ("WIRELESS" in Step S25), the vehicle ECU 500 determines whether an operation of turning on/off the start switch 510 has been performed within a predetermined time (Step S30). In order to prevent an erroneous operation, the operation of turning on/off the start switch 510 be performed a plurality of times in some embodiments.

When it is determined that the operation of turning on/off the start switch 510 has been performed within the predetermined time (YES in Step S30), the vehicle ECU 500 forcibly releases the timer charging (Step S40) and sets a timer charging forcible release flag indicating that the timer charging: is forcibly released to ON (Step S45).

On the other hand, when it is determined in Step S25 that the external charging is wired charging ("WIRED" in Step S25), the vehicle ECU 500 determines, whether an operation of pulling out the connector 40 has been performed within a predetermined time (Step S35). In order to prevent an erroneous operation, the operation of pulling out the connector 40 be performed a plurality of times in some embodiments. An operation of turning on/off a switch 42 disposed in the connector 40 may be performed instead of the operation of pulling out the connector 40.

When it is determined that the operation of pulling out the connector 40 has been performed within the predetermined time (YES in Step S35), the vehicle ECU 500 causes the routine to Step S40 and forcibly releases the timer charging.

When it is determined in Step S30 that the operation of turning on/off the start switch 510 has not been performed within the predetermined time (NO in Step S30), or when it is determined in Step S35 that the operation of pulling out the connector 40 has not been performed within the predetermined time (NO in Step S35), the vehicle ECU 500 returns the routine to Step S20.

When the timer charging forcible release flag is set to ON in Step S45, or when it is determined in Step S15 that the tinier charging has not been set (NO in Step S15), or when it is determined in Step S20 that the charging start time based on the time schedule of the tuner charging has arrived (YES in Step S20), the vehicle ECU 500 performs a process for starting the external charging (Step S50). Specifically, when wireless charging is performed, the vehicle ECU 500 turns on the relay 220 (turns off the relays 230 and 310) and instructs the power transmitting device 10 to start transmission of electric power via the communication device 530. On the other hand, when wired charging is perforated, the vehicle ECU 500 turns on the relay 230 (turns off the relays 220 and 310) and outputs a control signal for driving the charger 250 to the charger 250.

During execution of the external charging, the vehicle ECU 500 determines whether charging of the power storage device 300 has been completed (Step S55). For example, when the power storage device 300 reaches a fully charged state or reaches a desired amount of charged electric power in a state in which an amount of electric power which can be charged by the external charging can be set, it is determined that charging has been completed. When it is determined in Step S55 that charging has been completed (YES in Step S55), the external charging is stopped. When the timer charging forcible release flag is in the ON state, the flag is switched to OFF (Step S60). In this way, a series of processes ends.

As described above, according to the first embodiment, even if a malfunction m which input from the MID 520 is disabled occurs in the charging waiting state based on the timer charging, wireless charging is performed regardless of the timer charging having been set (even when the timer charging has been set) when a user performs a predetermined operation on the start switch 510 in a state in which the alignment process and the pairing process have been completed. Accordingly, according to the first embodiment, it is possible to start the wireless charging according to a user's desire even when a malfunction in which the timer charging cannot be released using the MID 520.

In the first embodiment, in a situation in which the alignment process and the pairing process have not been completed and the wireless charging cannot be performed (for example, a situation in which the vehicle is parked in a parking lot not having a power transmitting device 50), the tuner charging is not released but maintained even when a user performs a predetermined operation on the start switch 510. Accordingly, according to the first embodiment, it is possible to prevent the timer charging from being unnecessarily released in a situation in which the wireless charging cannot be executed.

[Second embodiment] In a second embodiment, a configuration capable of resetting (re-executing) timer charging after the tuner charging has been forcibly released as described in the first embodiment (forcible release based on the operation of the start switch 510) will be described.

The entire configuration of a power transmission system according to the second embodiment is the same as the configuration of the power transmission system according to the first embodiment illustrated in FIGS. 1 and 3.

Figure 7:
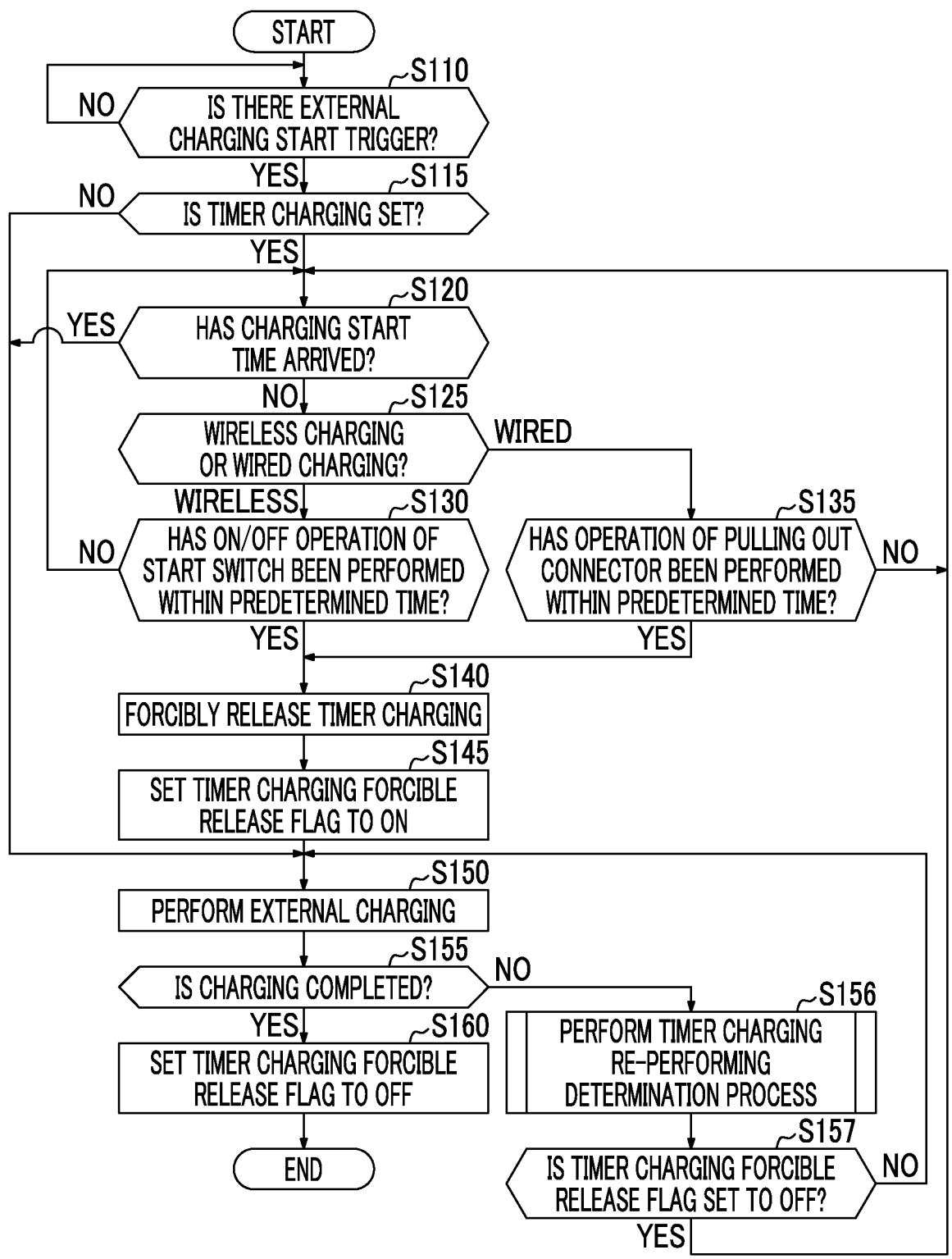
FIG. 7 is a flowchart illustrating a routine of a releasing operation and a resetting operation when releasing and resetting of the timer charging cannot be performed by the MID.

FIG. 7 is a flowchart illustrating a routine of a releasing operation and a resetting operation when releasing, and resetting of the timer charging cannot be performed using the MID 520. A series of processes illustrated in the flowchart is started when there is an external charging start trigger, similarly to the flowchart illustrated in FIG. 6.

The processes which are performed in Steps S110 to S160 are the same as the processes which are performed in Steps S10 to S60 in FIG. 6.

In the second embodiment, when if is determined in Step S155 that charging of the power storage device 300 has not been completed during execution of the external charging (NO in Step S155), the vehicle ECU 500 performs a process for determining whether the timer charging should be re-executed (Step S156). This process will be described later in detail.

After the process of Step S156 is performed, the vehicle ECU 500 determines whether the timer charging forcible release flag is in an OFF state (Step S157). As will be described later, when it is determined in Step S156 that the timer charging should be re-executed, the timer charging forcible release flag is set to the OFF state. On the other hand, when it is determined in Step S156 that the timer charging should not be re-executed, the timer charging forcible release flag is maintained in the ON state in the process of Step S156.

When it is determined in Step S157 that the tinier charging forcible release flag is in the ON state (NO in Step S157), the vehicle ECU 500 returns the routine to Step S150 and continues to execute the external charging.

On the other hand, when it is determined in Step S157 that the timer charging forcible release flag is in the OFF state (YES in Step S157), the vehicle ECU 500 returns the routine to Step S120 and re-executes the timer charging based on the time schedule which is set before the timer charging has been forcibly released.

Figure 8:
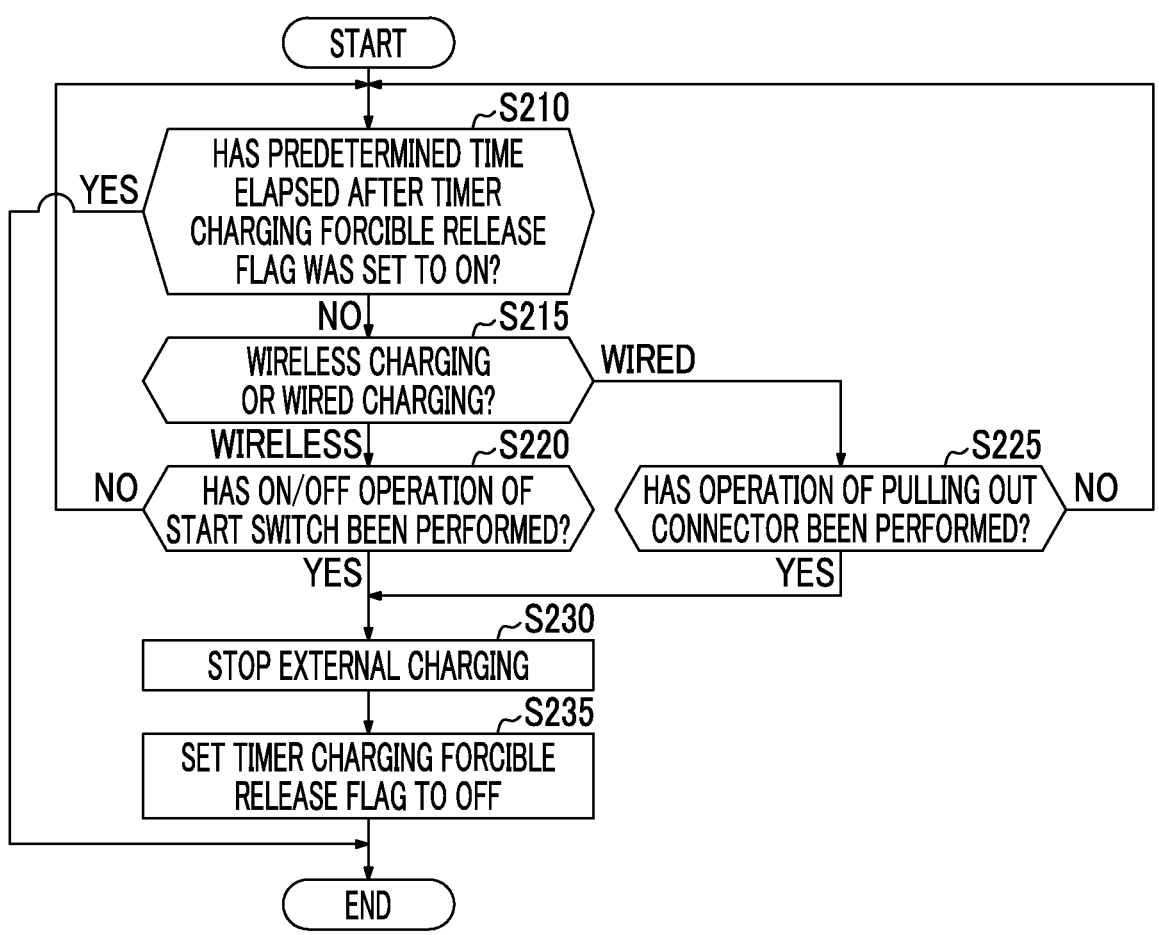
FIG. 8 is a flowchart illustrating a routine which is performed in Step S156 in FIG. 7.

FIG. 8 is a flowchart illustrating a routine which is performed in Step S156 in FIG. 7. Referring to FIG. 8, the vehicle ECU 500 determines whether a predetermined time has elapsed after the timer charging forcible release flag was set to the ON state (Step S210). The predetermined time is for defining a period in which resetting of the timer charging is allowed after the timer charging is forcibly released. When it is determined in Step S210 that the predetermined time has elapsed after the flag was set to the ON state (YES in Step S210), the routine ends without performing the subsequent processes. That is, in this case, the routine transitions to Step S157 in FIG. 7 with the timer charging forcible release flag maintained in the ON state.

When it is determined in Step S210 that the predetermined time has not elapsed after the timer charging forcible release flag was set to the ON state (NO in Step S210), the vehicle ECU 500 determines whether wireless charging is currently performed or whether wired charging is currently performed (Step S215).

When wireless charging is being performed ("WIRELESS" in Step S215), the vehicle ECU 500 determines whether an operation of turning on/off the start switch 510 has been performed (Step S220). Here, in order to prevent an erroneous operation, the operation of toning on/off the start switch 510 be performed a plurality of times in some embodiments.

When it is determined that the operation of turning on/off the start switch 510 has been performed (YES in Step S220), the vehicle ECU 500 stops the external charging (the wireless charging in this case) (Step S230) and sets the timer charging forcible release flag to the OFF state (Step S235). That is, in this case, since it is determined in Step S157 in FIG. 7 that the flag is in the OFF state, the routine is returned to Step S120 and the timer charging is re-executed.

On the other hand, when the wired charging is being performed ("WIRED" in Step S215), the vehicle ECU 500 determines whether an operation of pulling oat the connector 40 has been performed (Step S225). Here, in order to prevent an erroneous operation, the operation of pulling out the connector 40 be performed a plurality of times in some embodiments. An operation of turning on/off a switch 42 disposed in the connector 40 may be used instead of the operation of pulling out the connector 40.

When it is determined that the operation of pulling out the connector 40 has been performed (YES in Step S225), the vehicle ECU 500 causes the routine to transition to Step S230. That is, the external charging (the wired charging in this case) is stopped and the timer charging forcible release flag is set to the OFF state. That is, in this case, since it is determined, in Step S157 in FIG. 7 that the flag is in the OFF state, the routine is returned to Step S120 and the timer charging is re-executed.

As described above, in the second embodiment, when the operation of turning on/off the start switch 510 is performed again until the predetermined time elapses after the timer charging is forcibly released, the forcible release of the timer charging is stopped and the timer charging is re-executed. Accordingly; according to the second embodiment, the timer charging can be re-executed even when the timer charging is released by an erroneous operation of the start switch 510.

In the first and second embodiments, the timer charging is set based on a scheduled departure time or the like which is input via the MID 520 by a user (manual timer charging), but situations in which the vehicle 1 is used, situations in which the external charging is executed, and the like may be learned and the timer charging may be set based on the learning result without a user's setting the time or the like (automatic timer charging. (That is, the external charging can be executed regardless of the automatic timer charging having been set by performing a predetermined operation within a predetermined time as described above before the start time of the external charging based on the time schedule of the automatic timer charging arrives.

In the first and second embodiments, when the start switch 510 (at the time of wireless charging) or the connector 40 of the charging cable 44 (at the time of wired charging) receives a predetermined operation, the timer charging is released and the external charging is performed. However, in the first embodiment, the timer charging may not be released, but the external charging may be performed in a state in which the setting of the timer charging is ignored.

In the above description, the vehicle ECU 500 corresponds to an example of a "controller" in the claims, and the start switch 510 corresponds to an example of an "operation unit" in the claims.

It should be understood that the embodiment disclosed therein is exemplary in all points of view and is not restrictive. The scope of the present disclosure is not limited to description of the above-mentioned embodiment but is defined by the appended claims, and is intended to include ail modifications within meanings and scopes equivalent to the claims.

What is claimed is:

1. A vehicle comprising:
   a power receiving device configured to receive electric power from a power transmitting unit of a power transmitting device disposed outside the vehicle;
   a power storage device that stores the electric power received by the power receiving device;
   a switch configured to sequentially switch a state of the vehicle among a system stop, an accessory mode, and a system start and configured to receive a user's operation,
   the user's operation including a starting operation performed by a user to start a vehicle system, and a stopping operation performed by the user to stop the vehicle system; and
   an electronic control unit configured to
   i) perform control of executing timer charging of the power storage device based on a time schedule, and
   ii) perform a process of performing charging of the power storage device regardless of the timer charging having been set when the timer charging is set and the switch has received the user's operation before a charging start time based on the time schedule arrives.

2. The vehicle according to claim 1, wherein the power storage device is configured to receive the electric power from the power transmitting unit in a wireless manner.

3. The vehicle according to claim 2, wherein the electronic control unit is configured to perform the process regardless of the timer charging having been set when the timer charging is set and the switch has received the user's operation before the charging start time arrives, in a state in which a pairing process of associating the vehicle with the power transmitting device is completed.

4. The vehicle according to claim 2, wherein the electronic control unit is configured to determine that the switch has received the user's operation when the switch has been operated a plurality of times within a predetermined time.

5. The vehicle according to claim 2, wherein the electronic control unit is configured to stop performing the process and to perform the timer charging when the switch has additionally received the user's operation after the switch has once received the user's operation.

6. The vehicle according to claim 2, further comprising an inlet configured to connect to a connector of a charging table that is connected to the power source outside the vehicle,
wherein the vehicle is configured to charge the power storage device with the power source via the charging cable and the inlet, and
wherein the electronic control unit is configured to
i) perform control of performing the timer charging when the connector is connected to the inlet, and
ii) perform control of performing a process of charging the power storage device with the power source regardless of the timer charging having been set when the timer charging is set and a predetermined operation is performed on the connector before the charging start time arrives, in a state in which the connector is connected to the inlet.

7. A power transmission system for a vehicle comprising:
a power receiving device configured to receive electric power from a power transmitting unit of a power transmitting device disposed outside the vehicle;
a power storage device that stores the electric power received by the power receiving device;
a switch configured to sequentially switch a state of the vehicle among a system stop, an accessory mode, and a system start and configured to receive a user's operation,
the user's operation including a starting operation performed by a user to start a vehicle system, and a stopping operation performed by the user to stop the vehicle system; and
an electronic control unit configured to
i) perform control of executing timer charging of performing charging of the power storage device based on a time schedule; and
ii) perform a process of performing charging of the power storage device regardless of the timer charging having been set when the timer charging is set and the switch has received the user's operation before a charging start time based on the time schedule arrives.

8. The power transmission system according to claim 7, wherein the power storage device is configured to receive the electric power from the power transmitting unit in wireless manner.

* * * * *

UNITED STATES PATENT AND TRADEMARK OFFICE
CERTIFICATE OF CORRECTION

| | |
|---|---|
| PATENT NO. | : 10,894,478 B2 |
| APPLICATION NO. | : 15/900869 |
| DATED | : January 19, 2021 |
| INVENTOR(S) | : Tomokazu Masuda |

Page 1 of 1

It is certified that error appears in the above-identified patent and that said Letters Patent is hereby corrected as shown below:

In the Specification

Column 1, Line 36, delete "110822)," and insert --110822 A),--, therefor.

Column 16, Line 9, after "Accordingly", delete ";" and insert --,--, therefor.

Signed and Sealed this
Thirtieth Day of March, 2021

Drew Hirshfeld
*Performing the Functions and Duties of the*
*Under Secretary of Commerce for Intellectual Property and*
*Director of the United States Patent and Trademark Office*